US012424159B2

(12) United States Patent
Feng et al.

(10) Patent No.: US 12,424,159 B2
(45) Date of Patent: Sep. 23, 2025

(54) METHOD FOR COMPENSATING DISPLAY BRIGHTNESS, CIRCUIT FOR COMPENSATING DISPLAY BRIGHTNESS, AND DISPLAY DEVICE

(71) Applicants: Hefei BOE Joint Technology Co., Ltd., Anhui (CN); BOE Technology Group Co., Ltd., Beijing (CN)

(72) Inventors: Xuehuan Feng, Beijing (CN); Yongqian Li, Beijing (CN)

(73) Assignees: Hefei BOE Joint Technology Co., Ltd., Anhui (CN); BOE Technology Group Co., Ltd., Beijing (CN)

( * ) Notice: Subject to any disclaimer, the term of this patent is extended or adjusted under 35 U.S.C. 154(b) by 219 days.

(21) Appl. No.: 17/798,673

(22) PCT Filed: Nov. 10, 2021

(86) PCT No.: PCT/CN2021/129768
§ 371 (c)(1),
(2) Date: Aug. 10, 2022

(87) PCT Pub. No.: WO2022/156318
PCT Pub. Date: Jul. 28, 2022

(65) Prior Publication Data

US 2023/0084572 A1 Mar. 16, 2023

(30) Foreign Application Priority Data

Jan. 22, 2021 (CN) ........................ 202110089603.3

(51) Int. Cl.
*G09G 3/3208* (2016.01)

(52) U.S. Cl.
CPC ... *G09G 3/3208* (2013.01); *G09G 2320/0233* (2013.01)

(58) Field of Classification Search
CPC ......... G09G 3/3208; G09G 2320/0233; G09G 3/3233
See application file for complete search history.

(56) References Cited

U.S. PATENT DOCUMENTS 11,244,608 B2 * 2/2022 Su ........................ G09G 3/3225
11,355,052 B2 * 6/2022 Jun ...................... G09G 3/2007
(Continued)

FOREIGN PATENT DOCUMENTS

CN 101546540 A 9/2009
CN 101727815 A 6/2010
(Continued)

OTHER PUBLICATIONS

Dictionary.com, "adjacent," in Dictionary.com Unabridged. Source location: Random House, Inc. http://dictionary.reference.com/browse/adjacent, Nov. 18, 2011, p. 1.*
(Continued)

*Primary Examiner* — Jeff Piziali
(74) *Attorney, Agent, or Firm* — IPro, PLLC

(57) ABSTRACT

A method for compensating display brightness, a circuit for compensating display brightness, and a display device are provided. The method for compensating display brightness is applicable to a display device. A first group of sub-pixel rows in the display device perform normal display and black frame insertion display in a same frame display period. A second group of sub-pixel rows in the display device perform normal display in a current frame display period and an adjacent next frame display period, and perform black insertion display in the adjacent next frame display period. A first interval period is provided between the current frame display period and the adjacent next frame display period. The method for compensating includes: compensating luminous brightness of the first group of sub-pixel rows and/or
(Continued)

compensating luminous brightness of the second group of sub-pixel rows.

17 Claims, 6 Drawing Sheets

(56) References Cited

U.S. PATENT DOCUMENTS

| | | | | |
|---|---|---|---|---|
| 11,386,832 | B1 * | 7/2022 | Yoo | G09G 3/2096 |
| 11,443,693 | B2 * | 9/2022 | Takasugi | G09G 3/3275 |
| 2013/0194322 | A1 | 8/2013 | Kang | |
| 2015/0187268 | A1 | 7/2015 | Tani et al. | |
| 2015/0287350 | A1 * | 10/2015 | Jun | G09G 3/006 345/690 |
| 2017/0249890 | A1 * | 8/2017 | Yoo | G09G 3/2077 |
| 2018/0190202 | A1 | 7/2018 | Kong | |
| 2019/0130844 | A1 | 5/2019 | Yang et al. | |
| 2019/0197959 | A1 * | 6/2019 | Noh | G09G 3/3233 |
| 2020/0082762 | A1 | 3/2020 | Takasugi | |
| 2020/0212332 | A1 | 7/2020 | Shim et al. | |
| 2020/0410918 | A1 | 12/2020 | Gai et al. | |

FOREIGN PATENT DOCUMENTS

| | | | |
|---|---|---|---|
| CN | 103151005 | A | 6/2013 |
| CN | 103226930 | A | 7/2013 |
| CN | 104751788 | A | 7/2015 |
| CN | 107665666 | A | 2/2018 |
| CN | 108428721 | A | 8/2018 |
| CN | 109961741 | A | 7/2019 |
| CN | 110322833 | A | 10/2019 |
| CN | 110890060 | A | 3/2020 |
| CN | 111292664 | A | 6/2020 |
| CN | 111383599 | A | 7/2020 |
| CN | 112885299 | A | 6/2021 |
| JP | 2006330138 | A | 12/2006 |
| KR | 20180077804 | A | 7/2018 |

OTHER PUBLICATIONS

CN 202110089603.3 first office action. Published by the China National Intellectual Property Administration, by Bei Zhang, titled "First Office Action," with pp. 1-10 being relevant, published on Oct. 27, 2021 at 6 Xijimenqiao Xituchenglu, Haidian District, Beijing, China.

PCT/CN2021/129768 international search report and written opinion. Published by the China National Intellectual Property Administration, by Hai Le, titled "International search report" and "written opinion of the international search authority," with pp. 1-5 being relevant, published on Jan. 25, 2022 at 6 Xijimenqiao Xituchenglu, Haidian District, Beijing, China.

* cited by examiner

--Prior Art--

--Prior Art--

METHOD FOR COMPENSATING DISPLAY BRIGHTNESS, CIRCUIT FOR COMPENSATING DISPLAY BRIGHTNESS, AND DISPLAY DEVICE

CROSS-REFERENCE TO RELATED APPLICATION

This application is the U.S. national phase of PCT Application PCT/CN2021/129768 filed on Nov. 10, 2021, which claims priority to Chinese Patent Application No. 202110089603.3 filed in China on Jan. 22, 2021, the entire contents of which are hereby incorporated by reference.

TECHNICAL FIELD

The present disclosure relates to the technical field of display, and particularly to a method for compensating display brightness, a circuit for compensating display brightness, and a display device.

BACKGROUND

In the field of display, especially in an organic light-emitting diode display device, a smear phenomenon of a dynamic image is easy to occur during a switching process of the dynamic display image, that is, when switching from a previous frame display image to a next frame display image, the smear of the previous frame image will be felt. In order to overcome the smear phenomenon of the dynamic image, in the related art, a switching black process is added during a period when a pixel emits light, and a normal display period of the pixel is reduced by adding the switching black process, thereby preventing the smear phenomenon of the dynamic image.

However, when the switching black process is added to the display device, display brightness in different areas of the display device is likely to be uneven.

SUMMARY

A method for compensating display brightness is provided in a first aspect of the present disclosure. the method is applied to a display device, the display device includes a plurality of sub-pixel rows; the plurality of sub-pixel rows are divided into a first group of sub-pixel rows and a second group of sub-pixel rows, and the first group of sub-pixel rows perform normal display and black frame insertion display in a same frame display period; the second group of sub-pixel rows perform normal display in a current frame display period and an adjacent next frame display period, and perform black frame insertion display in the adjacent next frame display period; a first interval period is provided between the current frame display period and the adjacent next frame display period;

the method for compensating display brightness includes:

compensating luminous brightness of the first group of sub-pixel rows, and/or compensating luminous brightness of the second group of sub-pixel rows to make luminous brightness of sub-pixels of a first color displaying at a first grey scale in the first group of sub-pixel rows the same as the luminous brightness of sub-pixels of a first color displaying at a first grey scale in the second group of sub-pixel rows.

Optionally, the compensating the luminous brightness of the first group of sub-pixel rows, and/or compensating the luminous brightness of the second group of sub-pixel rows, includes:

determining a first target correlation curve between a display brightness corresponding to the sub-pixels of the first color in the first group of sub-pixel rows, and a data signal;

determining a second target correlation curve between a display brightness corresponding to the sub-pixels of the first color in the second group of sub-pixel rows, and the data signal;

determining, based on a target brightness to be displayed, a first target data signal according to the first target correlation curve, and a second target data signal according to the second target correlation curve; and writing the first target data signal to the sub-pixels of the first color displaying at the first grey scale in the first group of sub-pixel rows, and writing the second target data signal to the sub-pixels of the first color displaying at the first grey scale in the second group of sub-pixel rows.

In one embodiment, the determining the first target correlation curve and the second target correlation curve, includes:

writing a group of data signals to the sub-pixels of the first color in the first group of sub-pixel rows, and obtaining a corresponding group of display brightness;

plotting the first target correlation curve based on the group of data signals and the group of display brightness; and determining the second target correlation curve according to the group of display brightness.

Optionally, the determining the first target correlation curve and the second target correlation curve, includes:

writing a group of data signals to the sub-pixels of the first color in the second group of sub-pixel rows, and obtaining the corresponding group of display brightness;

plotting the second target correlation curve based on the group of data signals and the group of display brightness; and determining the first target correlation curve according to the group of display brightness.

In one embodiment, the compensating the luminous brightness of the first group of sub-pixel rows, and/or compensating the luminous brightness of the second group of sub-pixel rows, includes:

inserting a second interval period in each frame display period, to increase a normal display period of the first group of sub-pixel rows by the time length of the second interval period; and shortening a time length of the first interval period to the time length of the second interval period.

In one embodiment, the display device includes a plurality of frame display periods, the a plurality of frame display periods are successively divided into a plurality of groups of frame display periods, and each group of frame display periods include a first frame display period and a second frame display period which are adjacent to each other;

keeping the first frame display period and the second frame display period in the same group of frame display periods to have the first interval period therebetween;

inserting the first interval period into the second frame display period in each group of frame display periods, to increase, during the second frame display period, the normal display time of the first group of sub-pixel rows by the time length of the first interval period; and shortening the interval time between adjacent groups of frame display periods to 0.

On the basis of the technical solution of the above-mentioned method for compensating display brightness, a circuit for compensating display brightness for implementing the above-mentioned method for compensating display brightness is provided in a second aspect of the present disclosure, the circuit for compensating display brightness is applied to a display device, wherein the display device includes a plurality of sub-pixel rows; the plurality of sub-pixel rows are divided into a first group of sub-pixel rows and a second group of sub-pixel rows, and the first group of sub-pixel rows perform normal display and black frame insertion display in a same frame display period; the second group of sub-pixel rows perform normal display in a current frame display period and an adjacent next frame display period, and perform black frame insertion display in the adjacent next frame display period; a first interval period is provided between the current frame display period and the adjacent next frame display period;

the circuit for compensating display brightness includes:

a compensation module, configured to compensate luminous brightness of the first group of sub-pixel rows, and/or compensate luminous brightness of the second group of sub-pixel rows to make luminous brightness of sub-pixels of a first color displaying at a first grey scale in the first group of sub-pixel rows the same as the luminous brightness of sub-pixels of the first color displaying at the first grey scale in the second group of sub-pixel rows.

In one embodiment, the compensation module includes:

a correlation curve determination module, configured to determine a first target correlation curve between a display brightness corresponding to the sub-pixels of the first color in the first group of sub-pixel rows, and a data signal;

the correlation curve determination module is further configured to determine a second target correlation curve between a display brightness corresponding to the sub-pixels of the first color in the second group of sub-pixel rows, and a data signal;

a target data signal determination module, configured to determine, based on a target brightness to be displayed, a first target data signal according to the first target correlation curve, and a second target data signal according to the second target correlation curve; and a writing module, configured to write the first target data signal to the sub-pixels of the first color displaying at the first grey scale in the first group of sub-pixel rows, and writing the second target data signal to the sub-pixels of the first color displaying at the first grey scale in the second group of sub-pixel rows.

In one embodiment, the correlation curve determination module is configured to:

write a group of data signals to the sub-pixels of the first color in the first group of sub-pixel rows, and obtain a corresponding group of display brightness;

plot the first target correlation curve based on the group of data signals and the group of display brightness; and determine the second target correlation curve according to the group of display brightness.

In one embodiment, the correlation curve determination module is configured to:

write a group of data signals to the sub-pixels of the first color in the second group of sub-pixel rows, and obtain a corresponding group of display brightness;

plot the second target correlation curve based on the group of data signals and the group of display brightness; and determine the first target correlation curve according to the group of display brightness.

In one embodiment, the compensation module is configured to:

insert a second interval period in each frame display period, to increase a normal display period of the first group of sub-pixel rows by a time length of the second interval period; and shorten a time length of the first interval period to the time length of the second interval period.

In one embodiment, the display device includes a plurality of frame display periods, the a plurality of frame display periods are successively divided into a plurality of groups of frame display periods, and each group of frame display periods include a first frame display period and a second frame display period which are adjacent to each other; the compensation module is configured to:

keep the first frame display period and the second frame display period in the same group of frame display periods to have the first interval period therebetween;

insert the first interval period into the second frame display period in each group of frame display periods, to increase during the second frame display period, the normal display time of the first group of sub-pixel rows by the time length of the first interval period; and shorten the interval time between adjacent groups of frame display periods to 0.

On the basis of the technical solution of the above-mentioned circuit for compensating display brightness, a display device including the above-mentioned circuit for compensating display brightness is provided in a third aspect of the present disclosure.

On the basis of the technical solution of the above-mentioned circuit for compensating display brightness, a display device is provided in a fourth aspect of the present disclosure, including: a processor, and a memory storing computer-executable instructions which, when executed by the processor, perform the above-mentioned method for compensating display brightness.

On the basis of the technical solution of the above-mentioned circuit for compensating display brightness, a non-volatile storage medium storing computer-executable instructions for execution by a processor to perform the above-mentioned method for compensating display brightness is provided in a fifth aspect of the present disclosure.

BRIEF DESCRIPTION OF THE DRAWINGS

The accompanying drawings, which are included to provide a further understanding of the present disclosure and are incorporated in and constitute a part of the present disclosure, illustrate embodiment(s) of the present disclosure and together with the description serve to explain the disclosure and do not constitute an undue limitation of the disclosure. In the drawings.

DETAILED DESCRIPTION

In order to further explain a method for compensating display brightness, a circuit for compensating display brightness, and a display device provided by the embodiments of the present disclosure, a detailed description will be given below with reference to the accompanying drawings.

Figure 1:
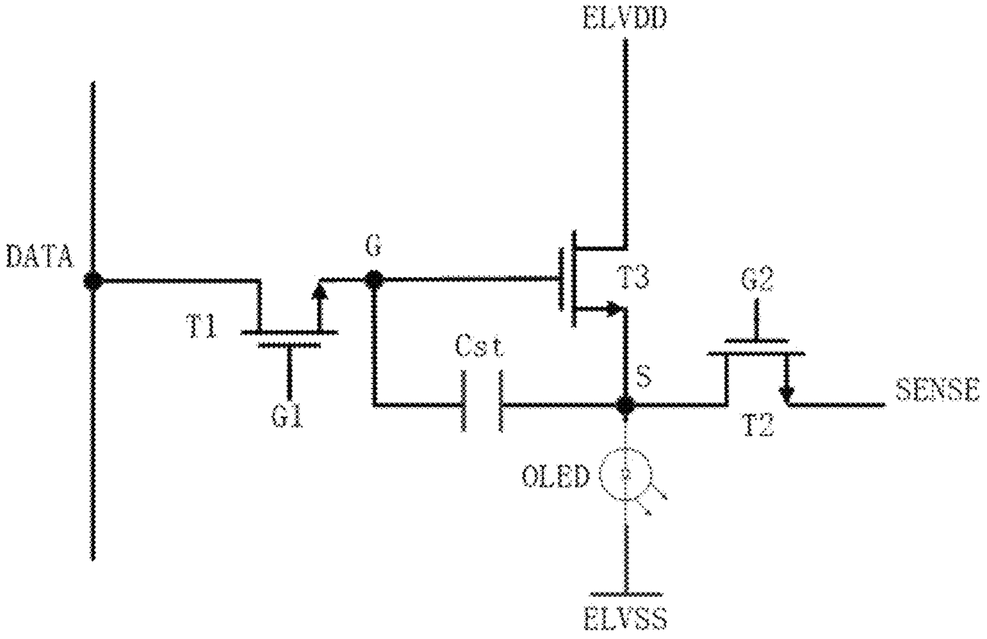
FIG. 1 is a structural diagram of a 3 Transistor—1 Capacitor (3T1C) circuit in the related art.
Figure 2:
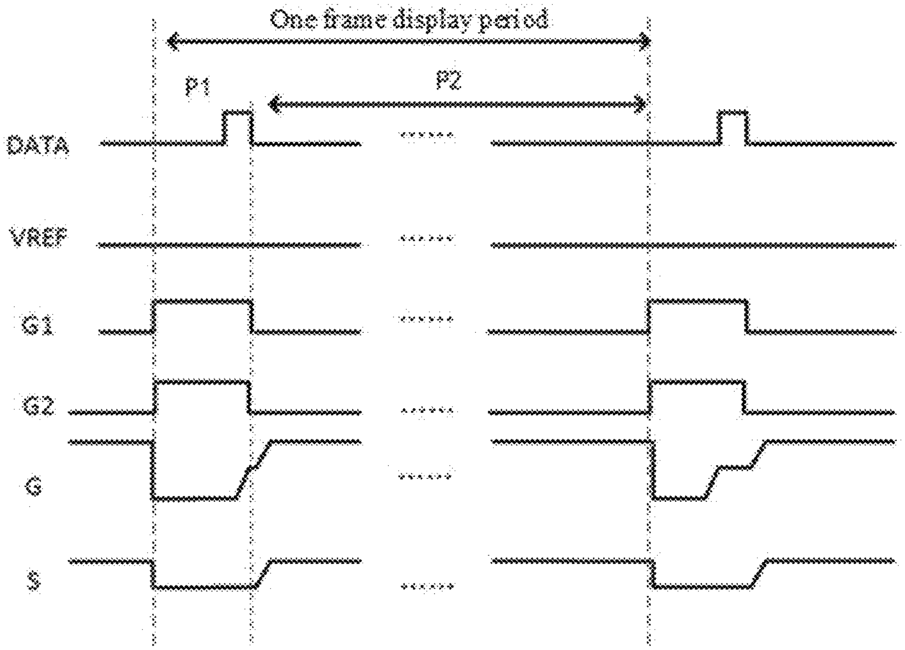
FIG. 2 is a diagram of a working sequence of the 3T1C circuit in the related art.

A pixel circuit of 3T1C architecture in the related art is shown in FIG. 1, and a corresponding working sequence thereof is shown in FIG. 2. A specific working process is as follows.

In a data writing phase P1, a scanning signal G1 controls a first transistor T1 to be turned on, a scanning signal G2 controls a second transistor T2 to be turned on, and a data signal DATA is written to a gate (point G) of a third transistor T3.

In a light-emitting phase P21, the scanning signal G1 controls the first transistor T1 to be turned off, the scanning signal G2 controls the second transistor T2 to be turned off, the gate potential of the third transistor T3 is bootstrapped through a storage capacitor Cst, the third transistor is turned on, and a light-emitting element OLED is controlled to emit light until a next data writing phase.

It should be noted that FIG. 1 also shows a positive power signal ELVDD, a negative power signal ELVSS, a sense signal SENSE, and a source of the third transistor T3, i.e. point S. A time sequence of a reference voltage signal VREF applied by other parts of the display device is also illustrated in FIG. 2.

Figure 3:
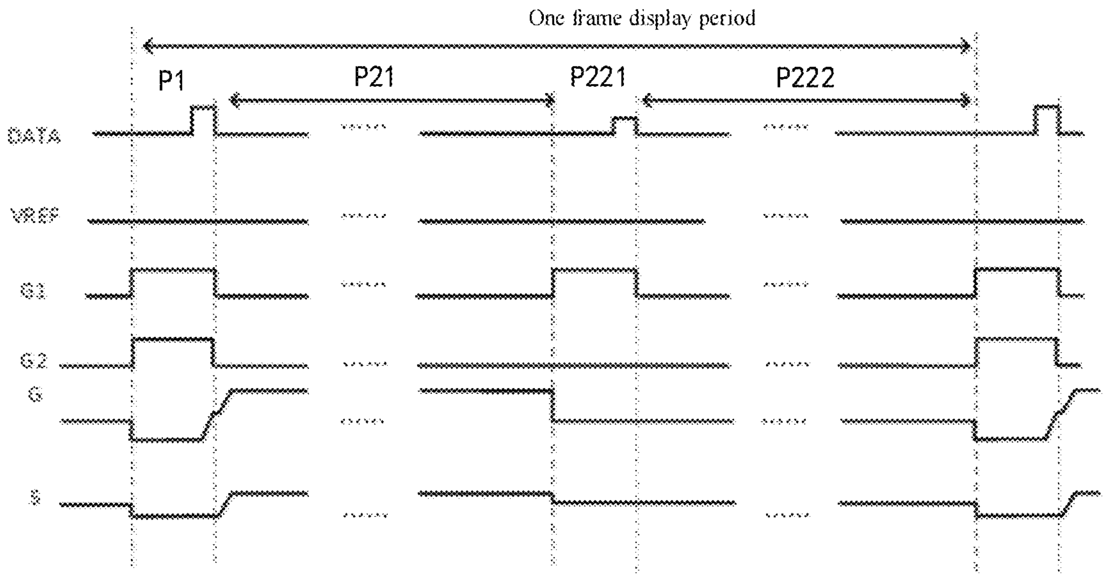
FIG. 3 is a diagram of a working sequence of a 3T1C circuit provided by an embodiment of the present disclosure.

When the above-mentioned pixel circuit is used to drive the display device to display a dynamic image, a smear phenomenon of the dynamic image is easy to occur during a switching process of the dynamic display image. In order to solve this problem, in the present disclosure, a switching black process is provided during a period when the pixel circuit emits light. As shown in FIG. 3, a specific operation process of the pixel circuit after adding the time sequence of a black frame insertion function is as follows.

In the data writing phase P1, the scanning signal G1 controls the first transistor T1 to be turned on, the scanning signal G2 controls the second transistor T2 to be turned on, and the data signal DATA is written to the gate (point G) of the third transistor T3.

In a normal display phase P2, the scanning signal G1 controls the first transistor T1 to be turned off, the scanning signal G2 controls the second transistor T2 to be turned off, the gate potential of the third transistor T3 is bootstrapped through the storage capacitor Cst, the third transistor is turned on, and pixels are control to perform normal display.

In a black frame insertion display phase, in a phase P221, the scanning signal G1 controls the first transistor T1 to be turned on, and black frame insertion data is written to the gate (point G) of the third transistor T3; in a phase P222, the pixels stop emitting light, and the image is switched to black.

It should be noted that the first transistor T1 can be controlled to be turned on at a certain moment when the pixels emit light, to make the gate potential of the third transistor T3 becomes 0, the pixels are switched to black to stop emitting light, and black frame insertion display can be performed. Alternatively, in the phase P221, the scanning signal G1 controls the first transistor T1 to be turned on, and the scanning signal G2 controls the second transistor T2 to be turned on, to make the third transistor T3 has a very low gate-source voltage Vgs, and the pixels are switched to black to stop emitting light, and black frame insertion display is performed.

Figure 4:
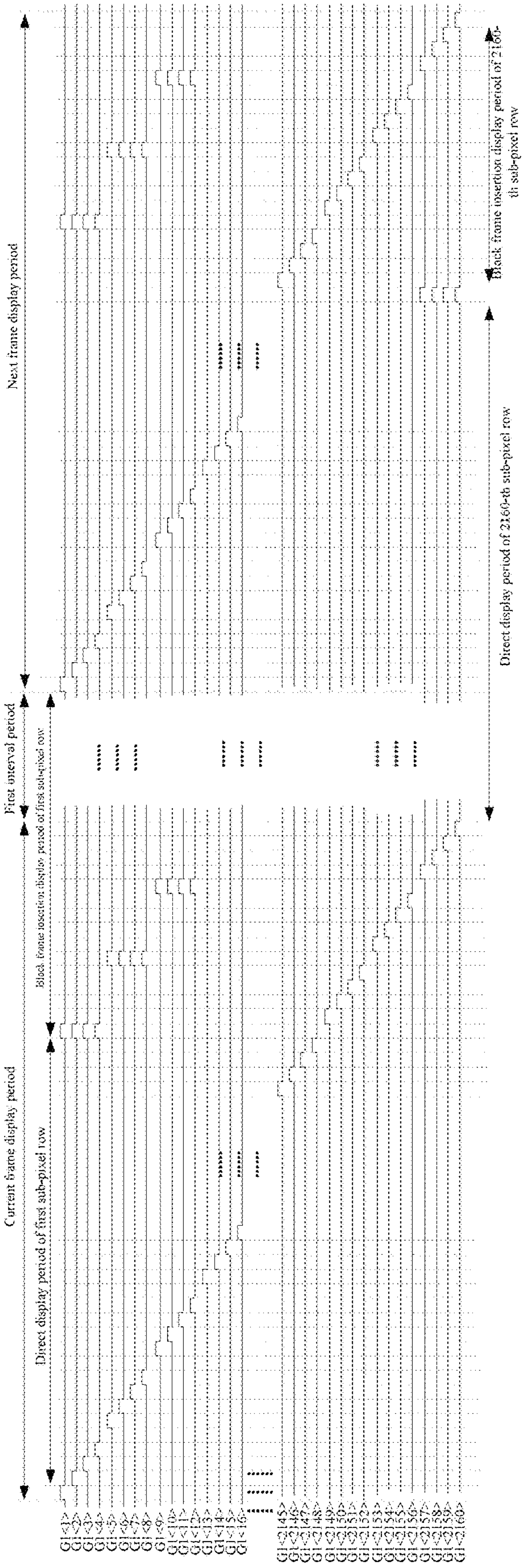
FIG. 4 is a first time sequence diagram of a display period of two consecutive frames in a display device provided by an embodiment of the present disclosure.

However, in the black frame insertion process, because the normal display and the black frame insertion display are not synchronized, a part of sub-pixel rows can perform the normal display and the black frame insertion display in the same frame display period, for example, the 1-st to 12-th sub-pixel rows shown in FIG. 4, and the other sub-pixel rows all perform the normal display in a current frame display period, and perform the black frame insertion display in an adjacent next frame display period. Since there is still a first interval period between the current frame display period and the adjacent next frame display period, a display period of the part of the sub-pixel rows are different from that of the other sub-pixel rows, namely, the display period of the other sub-pixel rows is longer than that of the part of the sub-pixel rows by the first interval period, so that display brightness of the part of the sub-pixel rows is lower than that of the other sub-pixel rows, resulting in non-uniform display brightness in different areas of the display device.

It should be noted that G1 <1> to G1 <2160> illustrated in FIG. 4 represent: a scanning signal G1 corresponding to first sub-pixel row to a scanning signal G1 corresponding to 2160-th sub-pixel row.

In more detail, with the display device including 2160 sub-pixel rows as an example, the 1st sub-pixel row and the 2160-th sub-pixel row are taken for illustration. It can be seen from FIG. 4 that display time of the first sub-pixel rows is data write time of the 1-st to 2144-th sub-pixel rows, and display time of the 2160-th sub-pixel row is a sum of the first interval period and the data write time of the 1st to 2144-th sub-pixel rows. Display time of the 2160-th sub-pixel row is longer than the display time of the 1-st sub-pixel row by the first interval period, resulting in a difference in display brightness of the sub-pixel row of the 1-st sub-pixel row and the 2160-th sub-pixel row.

With the presence of the above-mentioned problem, a method for compensating display brightness applied to a display device is provided by an embodiment of the present disclosure, where the display device includes a plurality of sub-pixel rows; the plurality of sub-pixel rows are divided into a first group of sub-pixel rows and a second group of sub-pixel rows, and the first group of sub-pixel rows perform normal display and black frame insertion display in a same frame display period; the second group of sub-pixel rows perform normal display in a current frame display period and an adjacent next frame display period, and perform black frame insertion display in the adjacent next frame display period; a first interval period is provided between the current frame display period and the adjacent next frame display period;

the method for compensating display brightness includes:

luminous brightness of the first group of sub-pixel rows is compensated, and/or luminous brightness of the second group of sub-pixel rows is compensated to make luminous brightness of sub-pixels of a first color displaying at a first grey scale in the first group of sub-pixel rows the same as luminous brightness of sub-pixels of a first color displaying at a first grey scale in the second group of sub-pixel rows.

Illustratively, during each frame display time, the first group of sub-pixel rows are scanned prior to the second group of sub-pixel rows.

Illustratively, each sub-pixel row includes a plurality of sub-pixels arranged in a first direction, and the first group of sub-pixel rows and the second group of sub-pixel rows are arranged in a second direction, the second direction intersects the first direction.

Illustratively, the first group of sub-pixel rows includes a plurality of first sub-pixel rows, and the second group of sub-pixel rows includes a plurality of second sub-pixel rows, the plurality of first sub-pixel rows alternates with the plurality of second sub-pixel rows.

Illustratively, the first group of sub-pixel rows can perform normal display and black frame insertion display in the same frame display period, namely, the first group of sub-pixel rows can complete normal display in the same frame display period and start black frame insertion display, and the black frame insertion display can continue to the next adjacent frame display period.

Illustratively, the second group of sub-pixel rows perform normal display in the current frame display period and the adjacent next frame display period, and perform black frame insertion display in the adjacent next frame display period; namely, the second group of sub-pixel rows perform normal display in two adjacent frame display periods, and the normal display time further includes the first interval period located between the two adjacent frame display periods.

In the method for compensating display brightness provided by the embodiments of the present disclosure, the luminous brightness of the first group of sub-pixel rows is compensated, and/or the luminous brightness of the second group of sub-pixel rows is compensated so that the luminous brightness of sub-pixels of the first color displaying at the first grey scale in the first group of sub-pixel rows is the same as the luminous brightness of sub-pixels of the first color displaying at the first grey scale in the second group of sub-pixel rows. Therefore, the problem of non-uniform display brightness in different areas of the display device after the switching-black process is added is effectively improved.

In some embodiments, the step that the luminous brightness of the first group of sub-pixel rows is compensated, and/or the luminous brightness of the second group of sub-pixel rows is compensated, includes:

a first target correlation curve between a display brightness corresponding to the sub-pixels of the first color in the first group of sub-pixel rows, and a data signal is determined;

a second target correlation curve between a display brightness corresponding to the sub-pixels of the first color in the second group of sub-pixel rows, and a data signal is determined;

based on a target brightness to be displayed, a first target data signal according to the first target correlation curve is determined, and a second target data signal according to the second target correlation curve is determined; and the first target data signal is written to the sub-pixels of the first color displaying at the first grey scale in the first group of sub-pixel rows, and the second target data signal is written to the sub-pixels of the first color displaying at the first grey scale in the second group of sub-pixel rows.

Illustratively, the display device includes red sub-pixels, green sub-pixels, blue sub-pixels, and white sub-pixels, and the first color includes any one of red, green, blue, and white.

Illustratively, the first grey scale is a grey scale value corresponding to the target brightness.

Illustratively, sub-pixels of each color in the display device correspond to one first target correlation curve and one second target correlation curve. Illustratively, red sub-pixels in the first group of sub-pixel rows correspond to one first target correlation curve, and red sub-pixels in the second group of sub-pixel rows correspond to one second target correlation curve.

Illustratively, after the target brightness to be displayed of the sub-pixels of the first color displaying at the first grey scale is determined, based on the target brightness, the first target data signal according to the first target correlation curve is determined, and the second target data signal according to the second target correlation curve is determined; and then the first target data signal is written to the sub-pixels of the first color displaying at the first grey scale in the first group of sub-pixel rows, and the second target data signal is written to the sub-pixels of the first color displaying at the first grey scale in the second group of sub-pixel rows, so that the sub-pixels of the first color displaying at the first grey scale in the first group of sub-pixel rows, and the sub-pixels of the first color displaying at the first grey scale in the second group of sub-pixel rows both can display with the target brightness.

In the method for compensating display brightness provided by the above embodiment of the present disclosure, the data signals written to sub-pixels of the first color displaying at the first grey scale in the first group of sub-pixel rows and/or the second group of sub-pixel rows are compensated so that the luminous brightness of sub-pixels of the first color displaying at the first grey scale in the first group of sub-pixel rows is the same as the luminous brightness of sub-pixels of the first color displaying at the first grey scale in the second group of sub-pixel rows. Therefore, the problem of non-uniform display brightness in different areas of the display device after the switching-black process is added is effectively improved.

Figure 5:
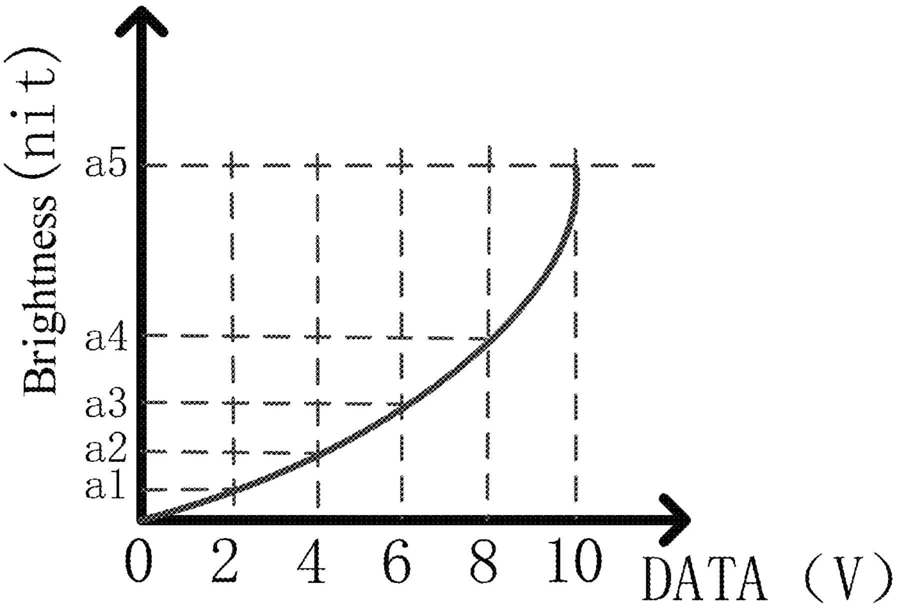
FIG. 5 is a schematic diagram of a first target correlation curve provided by an embodiment of the present disclosure.
Figure 6:
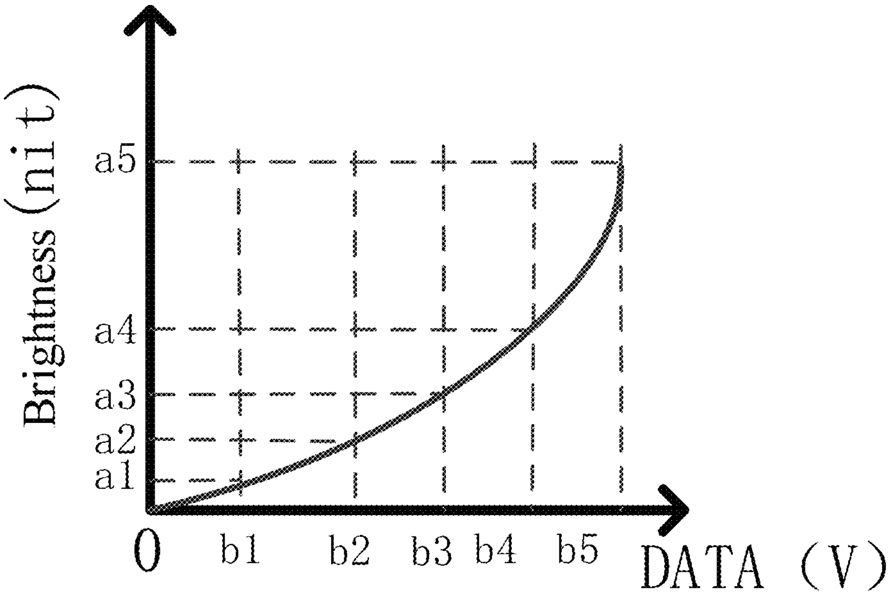
FIG. 6 is a schematic diagram of a second target correlation curve provided by an embodiment of the present disclosure.

As shown in FIGS. 5 and 6, in some embodiments, the step that the first target correlation curve and the second target correlation curve is determined, includes:

a group of data signals are written to the sub-pixels of the first color in the first group of sub-pixel rows, and a corresponding group of display brightness is obtained;

the first target correlation curve is plotted based on the group of data signals and the group of display brightness; and the second target correlation curve is determined according to the group of display brightness.

As shown in FIG. 5, illustratively, the group of data signals are written to the sub-pixels of the first color in the first group of sub-pixel rows, for example, 2 V, 4 V, 6 V, 8 V, 10 V, to measure the group of display brightness corresponding to different data signals, for example, a1, a2, a3, a4, a5, and the first target correlation curve is plotted based on the group of data signals and the group of display brightness.

As shown in FIG. 6, illustratively, according to the group of display brightness, for example, a1, a2, a3, a4, a5, the group of data signals are written to sub-pixels of the first color in the second group of sub-pixel rows, for example, b1, b2, b3, b4, b5, are measured, and the second target correlation curve is plotted based on the group of data signals and the group of display brightness.

In some embodiments, the step that the first target correlation curve and the second target correlation curve is determined, includes:

a group of data signals are written to the sub-pixels of the first color in the second group of sub-pixel rows, and a corresponding group of display brightness is obtained;

the second target correlation curve is plotted based on the group of data signals and the group of display brightness; and the first target correlation curve is determined according to the group of display brightness.

As shown in FIG. 6, illustratively, the group of data signals are written to the sub-pixels of the second color in the first group of sub-pixel rows, for example, b1, b2, b3, b4, b5, to measure the group of display brightness corresponding to different data signals, for example, a1, a2, a3, a4, a5, and the second target correlation curve is plotted based on the group of data signals and the group of display brightness.

As shown in FIG. 6, illustratively, according to the group of display brightness, for example, a1, a2, a3, a4, a5, the group of data signals are written to sub-pixels of the first color in the second group of sub-pixel rows, for example, 2 V, 4 V, 6 V, 8 V, 10 V, are measured, and the first target correlation curve is plotted based on the group of data signals and the group of display brightness.

Figure 7:
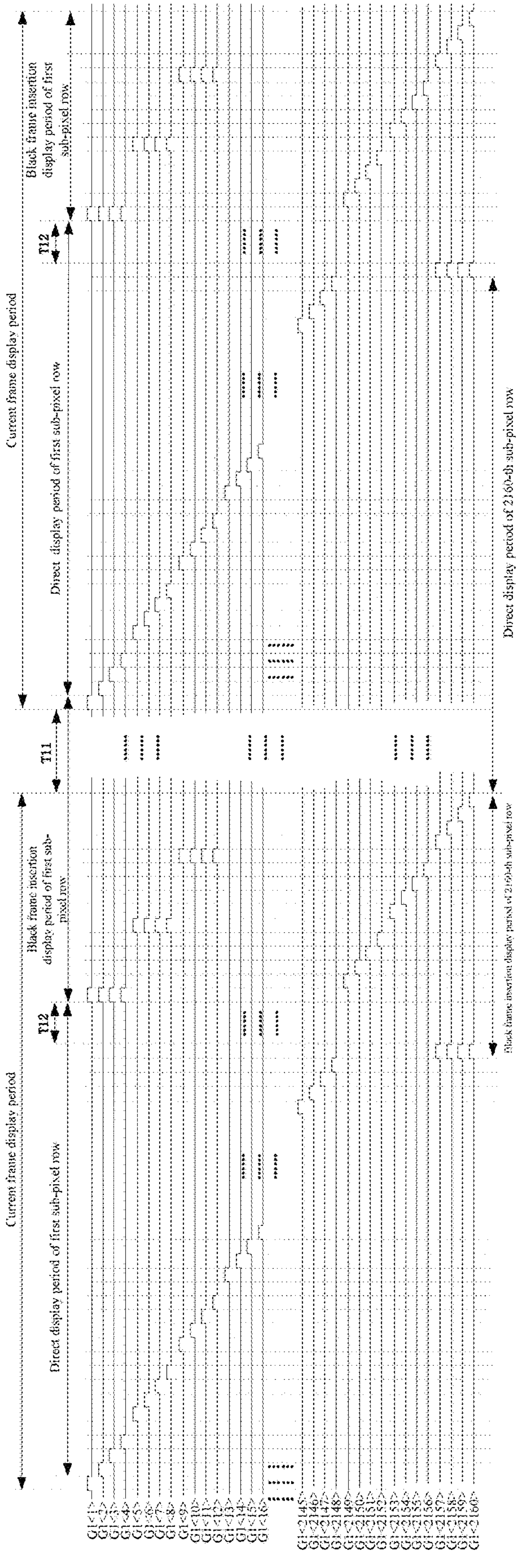
FIG. 7 is a second time sequence diagram of the display period of two consecutive frames in the display device provided by an embodiment of the present disclosure.

As shown in FIG. 7, in some embodiments, the step that the luminous brightness of the first group of sub-pixel rows is compensated, and/or the luminous brightness of the second group of sub-pixel rows is compensated, includes:

a second interval period is inserted in each frame display period, to increase a normal display period of the first group of sub-pixel rows by a time length T12 of the second interval period; and a time length of the first interval period is shortened to the time length (T11 in FIG. 7) of the second interval period.

Illustratively, the second interval period is inserted in each frame display period before a black frame insertion operation in the frame, so that the normal display period of the first group of sub-pixel rows is increased by the time length T12 of the second interval period.

Illustratively, after compensation according to the above-mentioned compensation method, the time length of the normal display period of the first sub-pixel row is data write time of the 1-st to 2144-th sub-pixel rows+T12, and the time length of the normal display period of the 2160-th sub-pixel row is T12+the data write time of the 1-st to 2144-th sub-pixel rows.

In the method for compensating display brightness provided by the above embodiment of the present disclosure, the normal display time sub-pixels of the first color displaying at the first grey scale in the first group of sub-pixel rows and/or the second group of sub-pixel rows are compensated so that the luminous brightness of sub-pixels of the first color displaying at the first grey scale in the first group of sub-pixel rows is the same as the luminous brightness of sub-pixels of the first color displaying at the first grey scale in the second group of sub-pixel rows. Therefore, the problem of non-uniform display brightness in different areas of the display device after the switching-black process is added is effectively improved.

Figure 8:
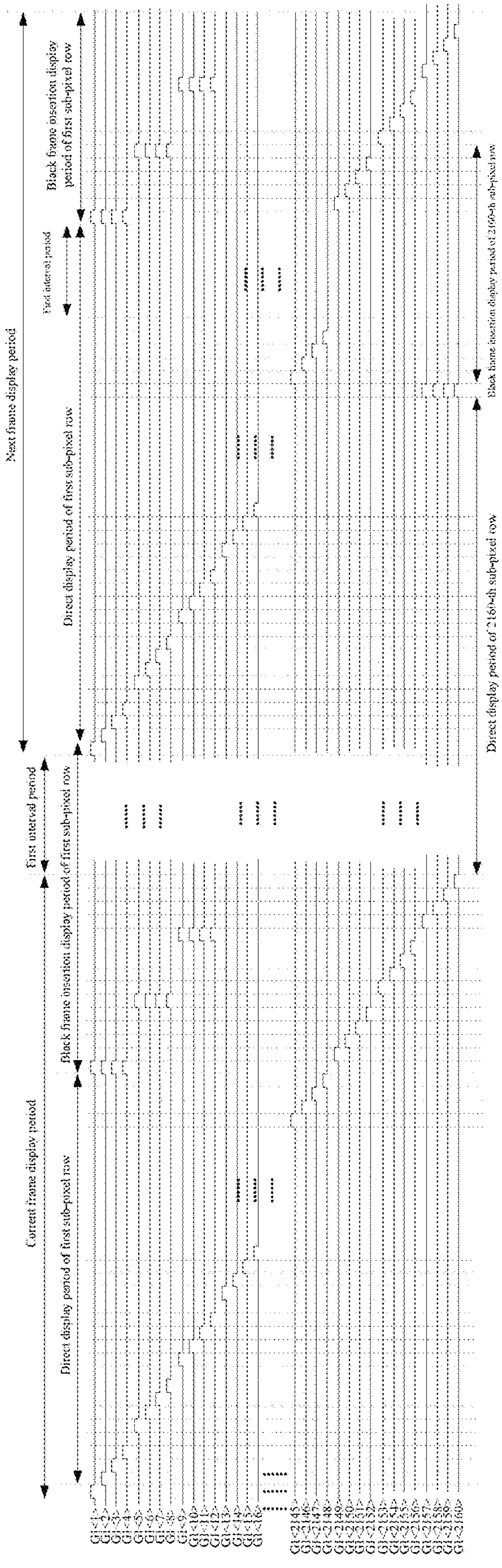
FIG. 8 is a third time sequence diagram of the display period of two consecutive frames in the display device provided by an embodiment of the present disclosure.

As shown in FIG. 8, in some embodiments, the display device includes a plurality of frame display periods, the a plurality of frame display periods are successively divided into a plurality of groups of frame display periods, and each group of frame display periods include a first frame display period and a second frame display period which are adjacent to each other;

the first frame display period and the second frame display period in the same group of frame display periods are kept to have the first interval period therebetween;

the first interval period is inserted into the second frame display period in each group of frame display periods, to increase, during the second frame display period, normal display time of the first group of sub-pixel rows by the time length of the first interval period; and the interval time between adjacent groups of frame display periods is shortened to 0.

Illustratively, the plurality of frame display periods are successively divided into the plurality of groups of frame display periods, each group of frame display periods include the first frame display period and the second frame display period which are adjacent to each other, and each frame display period can only belong to one group of frame display periods.

Illustratively, the first interval period is inserted in the second frame display period in each group of frame display periods before the black frame insertion operation in the frame, so that the normal display period in the second frame display period of the first group of sub-pixel rows is increased by the time length of the first interval period. Illustratively, in the second frame display period in each group of frame display periods, the first interval period is inserted after data is written from the 2144-th sub-pixel row.

Illustratively, the interval time between adjacent groups of frame display periods is shortened to 0, namely, after the group of frame display periods are completed, it directly enters the next adjacent group of frame display periods, and there is no time interval between the adjacent groups of frame display periods.

Illustratively, after compensation according to the above-mentioned compensation method, the time length of the normal display period of the first sub-pixel row is 2*(the data write time of the 1-st to 2144-th sub-pixel rows)+T, and the time length of the normal display period of the 2160-th sub-pixel row is 2*(the data write time of the 1-st to 2144-th sub-pixel rows)+T, where T is the time length of the first interval period.

In the method for compensating display brightness provided by the above embodiment of the present disclosure, the normal display time sub-pixels of the first color displaying at the first grey scale in the first group of sub-pixel rows and/or the second group of sub-pixel rows are compensated so that the luminous brightness of sub-pixels of the first color displaying at the first grey scale in the first group of sub-pixel rows is the same as the luminous brightness of sub-pixels of the first color displaying at the first grey scale in the second group of sub-pixel rows. Therefore, the problem of non-uniform display brightness in different areas of the display device after the switching-black process is added is effectively improved.

It should be noted that the display brightness is a cumulative amount, and since the display time as well as the brightness are constant over a certain period of time, the brightness difference can be eliminated.

A circuit for compensating display brightness for implementing the method for compensating display brightness is further provided by the above embodiment is provided by an embodiment of the present disclosure, the circuit for compensating display brightness is applied to a display device, where the display device includes a plurality of sub-pixel rows; the plurality of sub-pixel rows are divided into a first group of sub-pixel rows and a second group of sub-pixel rows, and the first group of sub-pixel rows perform normal display and black frame insertion display in a same frame display period; the second group of sub-pixel rows perform normal display in a current frame display period and an adjacent next frame display period, and perform black frame insertion display in the adjacent next frame display period; a first interval period is provided between the current frame display period and the adjacent next frame display period;

the circuit for compensating display brightness includes:

a compensation module.

The compensation module is configured to compensate luminous brightness of the first group of sub-pixel rows, and/or compensate luminous brightness of the second group of sub-pixel rows to make luminous brightness of sub-pixels of a first color displaying at a first grey scale in the first group of sub-pixel rows is the same as luminous brightness of sub-pixels of a first color displaying at a first grey scale in the second group of sub-pixel rows.

In the circuit for compensating display brightness provided by the embodiment of the present disclosure, the luminous brightness of the first group of sub-pixel rows is compensated, and/or the luminous brightness of the second group of sub-pixel rows is compensated by the compensation module so that the luminous brightness of sub-pixels of the first color displaying at the first grey scale in the first group of sub-pixel rows is the same as the luminous brightness of sub-pixels of the first color displaying at the first grey scale in the second group of sub-pixel rows. Therefore, the problem of non-uniform display brightness in different areas of the display device after the switching-black process is added is effectively improved.

In some embodiments, the compensation module includes: a correlation curve determination module, a target data signal determination module, and a writing module.

The correlation curve determination module is configured to determine a first target correlation curve between a display brightness corresponding to the sub-pixels of the first color in the first group of sub-pixel rows, and a data signal.

The correlation curve determination module is further configured to determine a second target correlation curve between a display brightness corresponding to the sub-pixels of the first color in the second group of sub-pixel rows, and a data signal.

The target data signal determination module is configured to determine, based on a target brightness to be displayed, a first target data signal according to the first target correlation curve, and a second target data signal according to the second target correlation curve.

The writing module is configured to write the first target data signal to the sub-pixels of the first color displaying at the first grey scale in the first group of sub-pixel rows, and writing the second target data signal to the sub-pixels of the first color displaying at the first grey scale in the second group of sub-pixel rows.

In the circuit for compensating display brightness provided by the above embodiment of the present disclosure, the data signals written to sub-pixels of the first color displaying at the first grey scale in the first group of sub-pixel rows and/or the second group of sub-pixel rows are compensated so that the luminous brightness of sub-pixels of the first color displaying at the first grey scale in the first group of sub-pixel rows is the same as the luminous brightness of sub-pixels of the first color displaying at the first grey scale in the second group of sub-pixel rows. Therefore, the problem of non-uniform display brightness in different areas of the display device after the switching-black process is added is effectively improved.

In some embodiments, the correlation curve determination module is configured to:

write a group of data signals to the sub-pixels of the first color in the first group of sub-pixel rows, and obtain a corresponding group of display brightness;

plot the first target correlation curve based on the group of data signals and the group of display brightness; and determine the second target correlation curve according to the group of display brightness.

In some embodiments, the correlation curve determination module is configured to:

write a group of data signals to the sub-pixels of the first color in the second group of sub-pixel rows, and obtain a corresponding group of display brightness;

plot the second target correlation curve based on the group of data signals and the group of display brightness; and determine the first target correlation curve according to the group of display brightness.

In some embodiments, the compensation module is configured to:

insert a second interval period in each frame display period, to increase a normal display period of the first group of sub-pixel rows by the time length of the second interval period; and shorten a time length of the first interval period to the time length of the second interval period.

In the circuit for compensating display brightness provided by the above embodiment of the present disclosure, the normal display time sub-pixels of the first color displaying at the first grey scale in the first group of sub-pixel rows and/or the second group of sub-pixel rows are compensated so that the luminous brightness of sub-pixels of the first color displaying at the first grey scale in the first group of sub-pixel rows is the same as the luminous brightness of sub-pixels of the first color displaying at the first grey scale in the second group of sub-pixel rows. Therefore, the problem of non-uniform display brightness in different areas of the display device after the switching-black process is added is effectively improved.

In some embodiments, the display device includes a plurality of frame display periods, the a plurality of frame display periods are successively divided into a plurality of groups of frame display periods, and each group of frame display periods include a first frame display period and a second frame display period which are adjacent to each other; the compensation module is configured to:

keep the first frame display period and the second frame display period in the same group of frame display periods to have the first interval period therebetween;

insert the first interval period into the second frame display period in each group of frame display periods, to increase during the second frame display period, the normal display time of the first group of sub-pixel rows by the time length of the first interval period; and shorten the interval time between adjacent groups of frame display periods to 0.

In the circuit for compensating display brightness provided by the above embodiment of the present disclosure, the normal display time sub-pixels of the first color displaying at the first grey scale in the first group of sub-pixel rows and/or the second group of sub-pixel rows are compensated so that the luminous brightness of sub-pixels of the first color displaying at the first grey scale in the first group of sub-pixel rows is the same as the luminous brightness of sub-pixels of the first color displaying at the first grey scale in the second group of sub-pixel rows. Therefore, the problem of non-uniform display brightness in different areas of the display device after the switching-black process is added is effectively improved.

A display device including the brightness compensation circuit described above is further provided by an embodiment of the present disclosure.

In the circuit for compensating display brightness provided by the above embodiment of the present disclosure, the luminous brightness of the first group of sub-pixel rows is compensated, and/or the luminous brightness of the second group of sub-pixel rows is compensated by the compensation module so that the luminous brightness of sub-pixels of the first color displaying at the first grey scale in the first group of sub-pixel rows is the same as the luminous brightness of sub-pixels of the first color displaying at the first grey scale in the second group of sub-pixel rows. Therefore, the problem of non-uniform display brightness in different areas of the display device after the switching-black process is added is effectively improved.

Therefore, the display device provided by this embodiment also has the above-described advantageous effects when including the above-described circuit for compensating display brightness, and the description thereof will not be repeated here.

It is to be noted that the display device may be a television, a display, a digital photo frame, a mobile phone, a tablet computer, or any product or component with a display function.

A display device is further provided by an embodiment of the present disclosure, including: a processor, and a memory storing computer-executable instructions which, when executed by the processor, perform the method for compensating display brightness provided by the above embodiment.

The display device includes a plurality of sub-pixel rows; the plurality of sub-pixel rows are divided into a first group of sub-pixel rows and a second group of sub-pixel rows, and the first group of sub-pixel rows perform normal display and black frame insertion display in a same frame display period; the second group of sub-pixel rows perform normal display in a current frame display period and an adjacent next frame display period, and perform black frame insertion display in the adjacent next frame display period; a first interval period is provided between the current frame display period and the adjacent next frame display period.

In particular, the computer-executable instructions, when executed by the processor, perform the following steps:

compensating the luminous brightness of the first group of sub-pixel rows, and/or the luminous brightness of the second group of sub-pixel rows to make the luminous brightness of sub-pixels of a first color displaying at a first grey scale in the first group of sub-pixel rows the same as the luminous brightness of sub-pixels of a first color displaying at a first grey scale in the second group of sub-pixel rows.

In one embodiment, the compensating the luminous brightness of the first group of sub-pixel rows, and/or the luminous brightness of the second group of sub-pixel rows, includes:

determining a first target correlation curve between a display brightness corresponding to the sub-pixels of the first color in the first group of sub-pixel rows, and a data signal;

determining a second target correlation curve between a display brightness corresponding to the sub-pixels of the first color in the second group of sub-pixel rows, and a data signal;

determining, based on a target brightness to be displayed, a first target data signal according to the first target correlation curve, and a second target data signal according to the second target correlation curve; and writing the first target data signal to the sub-pixels of the first color displaying at the first grey scale in the first group of sub-pixel rows, and writing the second target data signal to the sub-pixels of the first color displaying at the first grey scale in the second group of sub-pixel rows.

In one embodiment, the determining the first target correlation curve and the second target correlation curve, includes:

writing a group of data signals to the sub-pixels of the first color in the first group of sub-pixel rows, and obtaining a corresponding group of display brightness;

plotting the first target correlation curve based on the group of data signals and the group of display brightness; and determining the second target correlation curve according to the group of display brightness.

In one embodiment, the determining the first target correlation curve and the second target correlation curve, includes:

writing a group of data signals to the sub-pixels of the first color in the second group of sub-pixel rows, and obtaining a corresponding group of display brightness;

plotting the second target correlation curve based on the group of data signals and the group of display brightness; and determining the first target correlation curve according to the group of display brightness.

In one embodiment, the compensating the luminous brightness of the first group of sub-pixel rows, and/or the luminous brightness of the second group of sub-pixel rows includes:

inserting a second interval period is inserted in each frame display period, to increase a normal display period of the first group of sub-pixel rows by the time length of the second interval period; and shortening a time length of the first interval period to the time length of the second interval period.

In one embodiment, the display device includes a plurality of frame display periods, the a plurality of frame display periods are successively divided into a plurality of groups of frame display periods, and each group of frame display periods include a first frame display period and a second frame display period which are adjacent to each other;

the first frame display period and the second frame display period are kept in the same group of frame display periods to have the first interval period therebetween;

the first interval period is inserted into the second frame display period in each group of frame display periods, to increase, during the second frame display period, the normal display time of the first group of sub-pixel rows by the time length of the first interval period; and the interval time between adjacent groups of frame display periods is shortened to 0.

In the display device provided by the embodiment of the present disclosure, the luminous brightness of the first group of sub-pixel rows is compensated, and/or the luminous brightness of the second group of sub-pixel rows is compensated so that the luminous brightness of sub-pixels of the first color displaying at the first grey scale in the first group of sub-pixel rows is the same as the luminous brightness of sub-pixels of the first color displaying at the first grey scale in the second group of sub-pixel rows. Therefore, the problem of non-uniform display brightness in different areas of the display device after the switching-black process is added is effectively improved.

In the display device provided by the embodiment of the present disclosure, the data signals written to sub-pixels of the first color displaying at the first grey scale in the first group of sub-pixel rows and/or the second group of sub-pixel rows are compensated so that the luminous brightness of sub-pixels of the first color displaying at the first grey scale in the first group of sub-pixel rows is the same as the luminous brightness of sub-pixels of the first color displaying at the first grey scale in the second group of sub-pixel rows. Therefore, the problem of non-uniform display brightness in different areas of the display device after the switching-black process is added is effectively improved.

In the display device provided by the embodiment of the present disclosure, the normal display time of the sub-pixels of the first color displaying at the first grey scale in the first group of sub-pixel rows and/or the second group of sub-pixel rows are compensated so that the luminous brightness of sub-pixels of the first color displaying at the first grey scale in the first group of sub-pixel rows is the same as the luminous brightness of sub-pixels of the first color displaying at the first grey scale in the second group of sub-pixel rows. Therefore, the problem of non-uniform display brightness in different areas of the display device after the switching-black process is added is effectively improved.

A non-volatile storage medium storing computer-executable instructions is provided by an embodiment of the present disclosure, when the computer-executable instructions are executed by a processor, perform respective processes of the embodiments of the method for compensating display brightness provided in the above-described embodiments and achieve the same technical effects, and in order to avoid repetition, the description thereof will not be repeated. The computer-readable storage medium may be, for example, a Read-Only Memory (ROM), a Random Access Memory (RAM), a magnetic disk or an optical disk.

It should be noted that the various embodiments described herein are described in a progressive manner with reference to the same or similar parts throughout the various embodiments, with each embodiment focusing on differences from the other embodiments. In particular, the method embodiments are described more simply because they are substantially similar to the product embodiments, with reference to the partial description of the product embodiments.

Unless defined otherwise, technical or scientific terms used in this disclosure shall have the ordinary meaning as understood by one of ordinary skill in the art to which this disclosure belongs. The terms "first", "second", and the like as use herein do not denote any order, quantity, or importance, but rather are used to distinguish one element from another. The terms "comprising" or "comprises", and the like, means that the presence of an element or item preceding the word covers the presence of the element or item listed after the word and equivalents thereof, but does not exclude other elements or items. The terms "connecting", "coupling" or "connected" and the like are not limited to physical or mechanical connections, but may include electrical connections, whether direct or indirect. The terms "upper", "lower", "left", "right" and the like are used only to indicate relative positional relationships that may change accordingly when the absolute position of the object being described changes.

It will be understood that when an element such as a layer, film, region or substrate is referred to as being "on" or "under" another element, it can be "directly on" or "directly under" the other element or intervening elements may be present.

In the description of the embodiments above, particular features, structures, materials, or characteristics may be combined in any suitable manner in any one or more embodiments or examples.

While the present disclosure has been described with reference to specific embodiments thereof, it will be understood by those skilled in the art that various changes may be made and equivalents may be substituted for elements thereof without departing from the scope of the disclosure. Accordingly, the protection sought herein is as set forth in the claims below.

What is claimed is:

1. A method for compensating display brightness, applied to a display device, wherein the display device comprises a plurality of sub-pixel rows; the plurality of sub-pixel rows are divided into a first group of sub-pixel rows and a second group of sub-pixel rows, and the first group of sub-pixel rows perform direct display and black frame insertion display in a same frame display period; the second group of sub-pixel rows merely perform direct display in a current frame display period, and perform direct display and black frame insertion display in a next frame display period; a first interval period is provided between the current frame display period and the next frame display period;

the method for compensating display brightness comprises:

compensating luminous brightness of at least one of the first group of sub-pixel rows or the second group of sub-pixel rows to make luminous brightness of sub-pixels of a first color displaying at a first grey scale in the first group of sub-pixel rows the same as luminous brightness of sub-pixels of a first color displaying at a first grey scale in the second group of sub-pixel rows;

wherein the display device comprises a plurality of frame display periods, the plurality of frame display periods is successively divided into a plurality of groups of frame display periods, and each group of frame display periods comprise a first frame display period and a second frame display period, wherein the second frame display period is a next frame display period after the first frame display period;

the first frame display period and the second frame display period in the same group of frame display periods are kept to have the first interval period therebetween;

the first interval period is inserted after the second frame display period in each group of frame display periods, to increase, during the second frame display period, direct display time of the first group of sub-pixel rows by the time length of the first interval period; and interval time between each group of frame display periods and next group of frame display periods is shortened to 0;

wherein the current frame display period and the next frame display period belong to the plurality of frame display periods.

2. The method for compensating display brightness according to claim 1, wherein the compensating luminous brightness of at least one of the first group of sub-pixel rows or the second group of sub-pixel rows, comprises:

determining a first target correlation curve between a display brightness corresponding to the sub-pixels of the first color in the first group of sub-pixel rows, and a data signal;

determining a second target correlation curve between a display brightness corresponding to the sub-pixels of the first color in the second group of sub-pixel rows, and the data signal;

determining, based on a target brightness to be displayed, a first target data signal according to the first target correlation curve and a second target data signal according to the second target correlation curve; and writing the first target data signal to the sub-pixels of the first color displaying at the first grey scale in the first group of sub-pixel rows, and writing the second target data signal to the sub-pixels of the first color displaying at the first grey scale in the second group of sub-pixel rows.

3. The method for compensating display brightness according to claim 2, wherein the determining the first target correlation curve and the second target correlation curve, comprises:

writing a group of data signals to the sub-pixels of the first color in the first group of sub-pixel rows, and obtaining a corresponding group of display brightness;

plotting the first target correlation curve based on the group of data signals and the group of display brightness; and determining the second target correlation curve according to the group of display brightness.

4. The method for compensating display brightness according to claim 2, wherein the determining the first target correlation curve and the second target correlation curve, comprises:

writing a group of data signals to the sub-pixels of the first color in the second group of sub-pixel rows, and obtaining a corresponding group of display brightness;

plotting the second target correlation curve based on the group of data signals and the group of display brightness; and determining the first target correlation curve according to the group of display brightness.

5. The method for compensating display brightness according to claim 1, wherein the compensating luminous brightness of at least one of the first group of sub-pixel rows or the second group of sub-pixel rows, comprises:

inserting a second interval period in each frame display period, to increase a direct display period of the first group of sub-pixel rows by a time length of the second interval period; and shortening a time length of the first interval period to the time length of the second interval period.

6. A circuit for compensating display brightness for implementing the method for compensating display brightness of claim 1, the circuit for compensating display brightness is applied to a display device, wherein the display device comprises a plurality of sub-pixel rows; the plurality of sub-pixel rows are divided into a first group of sub-pixel rows and a second group of sub-pixel rows, and the first group of sub-pixel rows perform direct display and black frame insertion display in a same frame display period; the second group of sub-pixel rows merely perform direct display in a current frame display period, and perform direct display and black frame insertion display in a next frame display period; a first interval period is provided between the current frame display period and the next frame display period;

the circuit for compensating display brightness comprises:

a compensation sub-circuit, configured to compensate luminous brightness of at least one of the first group of sub-pixel rows and the second group of sub-pixel rows to make luminous brightness of sub-pixels of a first color displaying at a first grey scale in the first group of sub-pixel rows the same as luminous brightness of sub-pixels of a first color displaying at a first grey scale in the second group of sub-pixel rows;

wherein the current frame display period and the next frame display period belong to the plurality of frame display periods.

7. The circuit for compensating display brightness according to claim 6, wherein the compensation sub-circuit comprises:

a correlation curve determination sub-circuit, configured to determine a first target correlation curve between a display brightness corresponding to the sub-pixels of the first color in the first group of sub-pixel rows, and a data signal;

the correlation curve determination sub-circuit is further configured to determine a second target correlation curve between a display brightness corresponding to the sub-pixels of the first color in the second group of sub-pixel rows, and a data signal;

a target data signal determination sub-circuit, configured to determine, based on a target brightness to be displayed, a first target data signal according to the first target correlation curve and a second target data signal according to the second target correlation curve; and a writing sub-circuit, configured to write the first target data signal to the sub-pixels of the first color displaying at the first grey scale in the first group of sub-pixel rows, and writing the second target data signal to the sub-pixels of the first color displaying at the first grey scale in the second group of sub-pixel rows.

8. The circuit for compensating display brightness according to claim 7, wherein the correlation curve determination sub-circuit is configured to:

write a group of data signals to the sub-pixels of the first color in the first group of sub-pixel rows, and obtain a corresponding group of display brightness;

plot the first target correlation curve based on the group of data signals and the group of display brightness; and determine the second target correlation curve according to the group of display brightness.

9. The circuit for compensating display brightness according to claim 7, wherein the correlation curve determination sub-circuit is configured to:

write a group of data signals to the sub-pixels of the first color in the second group of sub-pixel rows, and obtain a corresponding group of display brightness;

plot the second target correlation curve based on the group of data signals and the group of display brightness; and determine the first target correlation curve according to the group of display brightness.

10. The circuit for compensating display brightness according to claim 6, wherein the compensation sub-circuit is configured to:

insert a second interval period in each frame display period, to increase a direct display period of the first group of sub-pixel rows by a time length of the second interval period; and shorten a time length of the first interval period to the time length of the second interval period.

11. A display device comprising a circuit for compensating display brightness for implementing the method for compensating display brightness of claim 1, the circuit for compensating display brightness is applied to a display device, wherein the display device comprises a plurality of sub-pixel rows; the plurality of sub-pixel rows are divided into a first group of sub-pixel rows and a second group of sub-pixel rows, and the first group of sub-pixel rows perform direct display and black frame insertion display in a same frame display period; the second group of sub-pixel rows merely perform direct display in a current frame display period, and perform direct display and black frame insertion display in the next frame display period; a first interval period is provided between the current frame display period and the next frame display period;

the circuit for compensating display brightness comprises:

a compensation sub-circuit, configured to compensate luminous brightness of at least one of the first group of sub-pixel rows and the second group of sub-pixel rows to make luminous brightness of sub-pixels of a first color displaying at a first grey scale in the first group of sub-pixel rows the same as luminous brightness of sub-pixels of a first color displaying at a first grey scale in the second group of sub-pixel rows;

wherein the current frame display period and the next frame display period belong to the plurality of frame display periods.

12. A display device comprising: a processor, and a memory storing computer-executable instructions which, when executed by the processor, perform the method for compensating display brightness of claim 1.

13. A non-volatile storage medium storing computer-executable instructions which, when executed by a processor, perform the method for compensating display brightness of claim 1.

14. The display device according to claim 11, wherein the compensation sub-circuit comprises:

a correlation curve determination sub-circuit, configured to determine a first target correlation curve between a display brightness corresponding to the sub-pixels of the first color in the first group of sub-pixel rows, and a data signal;

the correlation curve determination sub-circuit is further configured to determine a second target correlation curve between a display brightness corresponding to the sub-pixels of the first color in the second group of sub-pixel rows, and a data signal;

a target data signal determination sub-circuit, configured to determine, based on a target brightness to be displayed, a first target data signal according to the first target correlation curve and a second target data signal according to the second target correlation curve; and a writing sub-circuit, configured to write the first target data signal to the sub-pixels of the first color displaying at the first grey scale in the first group of sub-pixel rows, and writing the second target data signal to the sub-pixels of the first color displaying at the first grey scale in the second group of sub-pixel rows.

15. The display device according to claim 14, wherein the correlation curve determination sub-circuit is configured to:

write a group of data signals to the sub-pixels of the first color in the first group of sub-pixel rows, and obtain a corresponding group of display brightness;

plot the first target correlation curve based on the group of data signals and the group of display brightness; and determine the second target correlation curve according to the group of display brightness.

16. The display device according to claim 14, wherein the correlation curve determination sub-circuit is configured to:

write a group of data signals to the sub-pixels of the first color in the second group of sub-pixel rows, and obtain a corresponding group of display brightness;

plot the second target correlation curve based on the group of data signals and the group of display brightness; and determine the first target correlation curve according to the group of display brightness.

17. The display device according to claim 11, wherein the compensation sub-circuit is configured to:

insert a second interval period in each frame display period, to increase a direct display period of the first group of sub-pixel rows by a time length of the second interval period; and shorten a time length of the first interval period to the time length of the second interval period.

* * * * *